United States Patent
Knippen et al.

(10) Patent No.: US 10,180,138 B2
(45) Date of Patent: Jan. 15, 2019

(54) COMPRESSOR TEMPERATURE CONTROL SYSTEMS AND METHODS

(71) Applicant: EMERSON CLIMATE TECHNOLOGIES, INC., Sidney, OH (US)

(72) Inventors: Keith Michael Knippen, Tipp City, OH (US); Guoping Wu, Suzhou (CN); Richard Allen Miu, Sidney, OH (US); Michael J. Monnin, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 199 days.

(21) Appl. No.: 15/034,483

(22) PCT Filed: Apr. 4, 2014

(86) PCT No.: PCT/CN2014/074817
§ 371 (c)(1),
(2) Date: May 4, 2016

(87) PCT Pub. No.: WO2015/149356
PCT Pub. Date: Oct. 8, 2015

(65) Prior Publication Data
US 2016/0298627 A1    Oct. 13, 2016

(51) Int. Cl.
*G06F 19/00* (2018.01)
*F04C 28/18* (2006.01)
(Continued)

(52) U.S. Cl.
CPC ........ *F04C 28/18* (2013.01); *F04C 18/0215* (2013.01); *F04C 28/28* (2013.01);
(Continued)

(58) Field of Classification Search
None
See application file for complete search history.

(56) References Cited

U.S. PATENT DOCUMENTS 5,950,443 A * 9/1999 Meyer .................... F04C 28/00
                                                  417/292
6,601,397 B2   8/2003 Pham et al.
(Continued)

FOREIGN PATENT DOCUMENTS

CN    101275799 A   10/2008
CN    101356411 A    1/2009
(Continued)

OTHER PUBLICATIONS

Extended European Search Report for 14888259.0, dated Dec. 5, 2017.
(Continued)

*Primary Examiner* — Miranda M Huang
*Assistant Examiner* — Hung H Dang
(74) *Attorney, Agent, or Firm* — Harness, Dickey & Pierce, P.L.C.

(57) ABSTRACT

A system for controlling capacity of a compressor comprises a minimum determination module (204) selectively increasing a minimum capacity of a compressor when a temperature of the compressor is greater than a first predetermined temperature; and a control module (104) increasing an actual capacity of the compressor in response to an increase in the minimum capacity. A method for controlling capacity of a compressor is also disclosed. The system and method modulate the capacity of the compressor according to the different temperatures.

20 Claims, 13 Drawing Sheets

(51) Int. Cl.
  *F25B 49/02* (2006.01)
  *F25B 31/02* (2006.01)
  *F04C 18/02* (2006.01)
  *F04C 28/28* (2006.01)
  *F04C 29/00* (2006.01)
  *G05B 11/42* (2006.01)

(52) U.S. Cl.
  CPC ........ *F04C 29/0085* (2013.01); *F25B 31/026* (2013.01); *F25B 49/02* (2013.01); *F25B 49/022* (2013.01); *G05B 11/42* (2013.01); *F04C 2240/40* (2013.01); *F25B 2600/025* (2013.01); *F25B 2600/0253* (2013.01); *F25B 2700/21152* (2013.01)

(56) References Cited

U.S. PATENT DOCUMENTS

| | | | |
|---|---|---|---|
| 6,745,584 B2 | 6/2004 | Pham et al. | |
| 7,607,899 B2 | 10/2009 | Van Praag et al. | |
| 7,793,509 B2 | 9/2010 | Crane | |
| 7,918,655 B2 | 4/2011 | Hurst, Jr. et al. | |
| 8,287,230 B2 | 10/2012 | Hurst, Jr. et al. | |
| 8,485,789 B2 | 7/2013 | Gu et al. | |
| 2001/0032471 A1 | 10/2001 | Taguchi | |
| 2002/0157409 A1 | 10/2002 | Pham et al. | |
| 2003/0033823 A1 | 2/2003 | Pham et al. | |
| 2005/0244277 A1 | 11/2005 | Hurst et al. | |
| 2007/0056300 A1 | 3/2007 | Crane | |
| 2009/0324426 A1* | 12/2009 | Moody | F04B 39/0207 417/13 |
| 2011/0008181 A1 | 1/2011 | Hurst, Jr. et al. | |
| 2011/0011125 A1 | 1/2011 | Kasahara | |
| 2013/0189074 A1 | 7/2013 | Chen et al. | |
| 2015/0337831 A1* | 11/2015 | Zhou | F04B 49/20 700/276 |

FOREIGN PATENT DOCUMENTS

| | | |
|---|---|---|
| CN | 101755126 A | 6/2010 |
| CN | 101975167 A | 2/2011 |
| CN | 101978227 A | 2/2011 |
| CN | 102493945 A | 6/2012 |
| EP | 0232188 A2 | 8/1987 |
| EP | 1197661 A1 | 4/2002 |
| KR | 20050056980 A | 6/2005 |

OTHER PUBLICATIONS

International Search Report and Written Opinion of the International Searching Authority (in English) for PCT/CN2014/074817, dated Jan. 5, 2014; ISA/CN.

Chinese Office Action for Chinese Application No. 201510162152.6 dated Apr. 25, 2016.

* cited by examiner

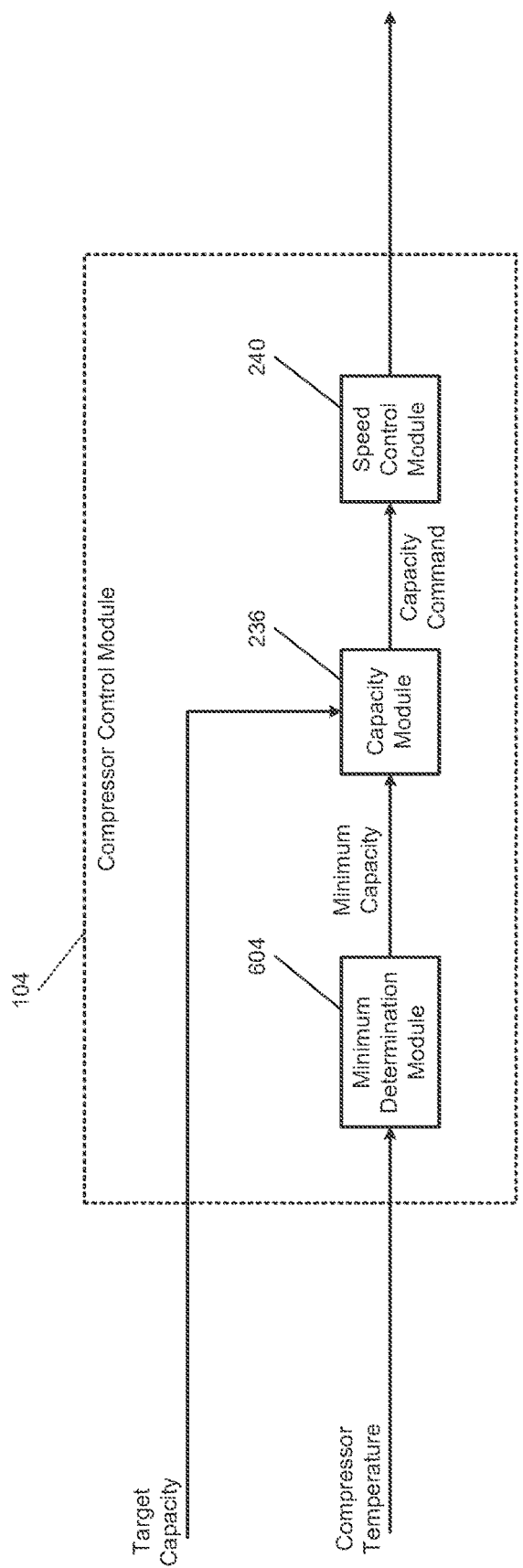

COMPRESSOR TEMPERATURE CONTROL SYSTEMS AND METHODS

FIELD

The present disclosure relates to compressors and more particularly to temperature control systems and methods for compressors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compressors may be used in a wide variety of industrial and residential applications to circulate refrigerant within a refrigeration, heat pump, HVAC, or chiller system (generically "heat pump systems") to provide a desired heating or cooling effect. In any of the foregoing applications, the compressor should provide consistent and efficient operation to ensure that the particular heat pump system functions properly.

Compressors may include crankcases to house moving parts of the compressor, such as a crankshaft. Crankcases may further include lubricant sumps, such as an oil reservoir. Lubricant sumps include lubricants that lubricate the moving parts of compressors. Lubrication of the moving parts may improve performance and/or prevent damage.

SUMMARY

In a feature, a compressor capacity control system is disclosed. A minimum determination module selectively increases a minimum capacity of a compressor when a temperature of the compressor is greater than a first predetermined temperature. A control module increases an actual capacity of the compressor in response to an increase in the minimum capacity.

In further features, a capacity command module sets a capacity command to a greater one of the minimum capacity and a target capacity of the compressor. The control module controls the actual capacity of the compressor based on the capacity command.

In still further features, the minimum determination module sets the minimum capacity to a predetermined maximum capacity of the compressor when the temperature of the compressor is greater than a second predetermined temperature. The second predetermined temperature is greater than the first predetermined temperature.

In yet further features, the minimum determination module sets the minimum capacity to a predetermined minimum capacity of the compressor when the temperature of the compressor is less than the first predetermined temperature.

In further features, a proportional, integral, derivative (PID) module determines an adjustment value based on a difference between the temperature of the compressor and a target compressor temperature. The minimum determination module adjusts the minimum capacity based on the adjustment value.

In yet further features, the PID module increases the adjustment value when the temperature of the compressor is greater than the target compressor temperature, and the minimum determination module increases the minimum capacity when the adjustment value increases.

In still further features, the PID module decreases the adjustment value when the temperature of the compressor is less than the target compressor temperature, and the minimum determination module decreases the minimum capacity when the adjustment value decreases.

In further features, the minimum determination module determines the minimum capacity using one of a function and a mapping that relates the temperature of the compressor to the minimum capacity.

In yet further features, the minimum determination module: increments the minimum capacity by a predetermined increment amount when the temperature of the compressor is greater than a third predetermined temperature for a first predetermined period; and decrements the minimum capacity by a predetermined decrement amount when the temperature of the compressor is less than a fourth predetermined temperature for a second predetermined period.

In still further features, the fourth predetermined temperature is less than the third predetermined temperature.

In further features, the temperature of the compressor is measured using a discharge temperature sensor.

In still further features, the control module increases a speed of the compressor in response to the increase in the minimum capacity.

In yet further features, the control module increases a volume of a compression chamber of the compressor in response to the increase in the minimum capacity.

In a feature, a compressor capacity control method is disclosed. The compressor capacity control method includes: selectively increasing a minimum capacity of a compressor when a temperature of the compressor is greater than a first predetermined temperature; and increasing an actual capacity of the compressor in response to an increase in the minimum capacity.

In further features, the compressor capacity control method further includes: setting a capacity command to a greater one of the minimum capacity and a target capacity of the compressor; and controlling the actual capacity of the compressor based on the capacity command.

In still further features, the compressor capacity control method further includes setting the minimum capacity to a predetermined maximum capacity of the compressor when the temperature of the compressor is greater than a second predetermined temperature, wherein the second predetermined temperature is greater than the first predetermined temperature.

In yet further features, the compressor capacity control method further includes setting the minimum capacity to a predetermined minimum capacity of the compressor when the temperature of the compressor is less than the first predetermined temperature.

In further features, the compressor capacity control method further includes: determining an adjustment value, using a proportional, integral, derivative (PID) module, based on a difference between the temperature of the compressor and a target compressor temperature; and adjusting the minimum capacity based on the adjustment value.

In still further features, the compressor capacity control method further includes: increasing the adjustment value when the temperature of the compressor is greater than the target compressor temperature; decreasing the adjustment value when the temperature of the compressor is less than the target compressor temperature; increasing the minimum capacity when the adjustment value increases; and decreasing the minimum capacity when the adjustment value decreases.

In yet further features, the compressor capacity control method further includes determining the minimum capacity using one of a function and a mapping that relates the temperature of the compressor to the minimum capacity.

In further features, the compressor capacity control method further includes: incrementing the minimum capacity by a predetermined increment amount when the temperature of the compressor is greater than a third predetermined temperature for a first predetermined period; and decrementing the minimum capacity by a predetermined decrement amount when the temperature of the compressor is less than a fourth predetermined temperature for a second predetermined period.

In still further features, the fourth predetermined temperature is less than the third predetermined temperature.

In yet further features, the compressor capacity control method further includes increasing the actual capacity of the compressor includes increasing a speed of the compressor in response to the increase in the minimum capacity.

In still further features, increasing the actual capacity of the compressor includes increasing a volume of a compression chamber of the compressor in response to the increase in the minimum capacity.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 9A-9B are functional block diagrams of example compressor control modules.

In the drawings, reference numbers may be reused to identify similar and/or identical elements.

DETAILED DESCRIPTION

Figure 1:
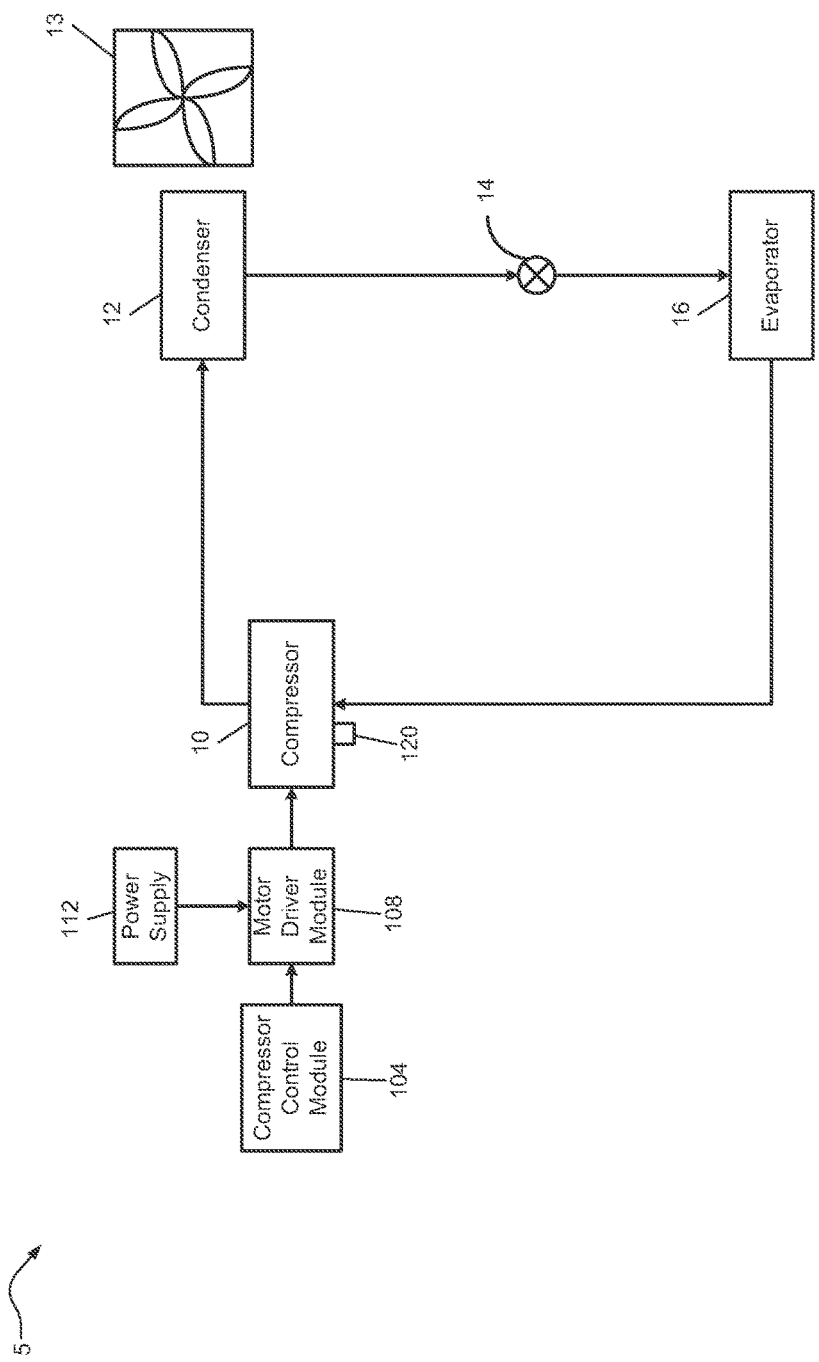
FIG. 1 is a functional block diagram of an example heat pump system.

With reference to FIG. 1, a functional block diagram of an example heat pump system 5 is presented. The heat pump system 5 includes a compressor 10 that includes a shell that houses a compression mechanism. In an ON state, the compression mechanism is driven by an electric motor to compress refrigerant vapor. In an OFF state, the compression mechanism does not compress refrigerant vapor.

The compressor 10 provides compressed refrigerant vapor to a condenser 12 where the refrigerant vapor is liquefied at high pressure, thereby rejecting heat to the outside air. A condenser fan 13 may be implemented to regulate airflow past the condenser 12. Liquid refrigerant exiting the condenser 12 is delivered to an evaporator 16 through an expansion valve 14. The expansion valve 14 may be a mechanical, thermal, or electronic valve for controlling super heat of the refrigerant entering the compressor 10.

The refrigerant passes through the expansion valve 14 where a pressure drop causes the high pressure liquid refrigerant to achieve a lower pressure combination of liquid and vapor. As hot air moves across the evaporator 16, the low pressure liquid refrigerant turns into gas, thereby removing heat from the hot air adjacent the evaporator 16. While not shown, a fan or blower is generally provided to facilitate airflow past the evaporator 16. The low pressure refrigerant is delivered to the compressor 10 where it is compressed, and delivered to the condenser 12 to start the heat pump cycle again.

Figure 2:
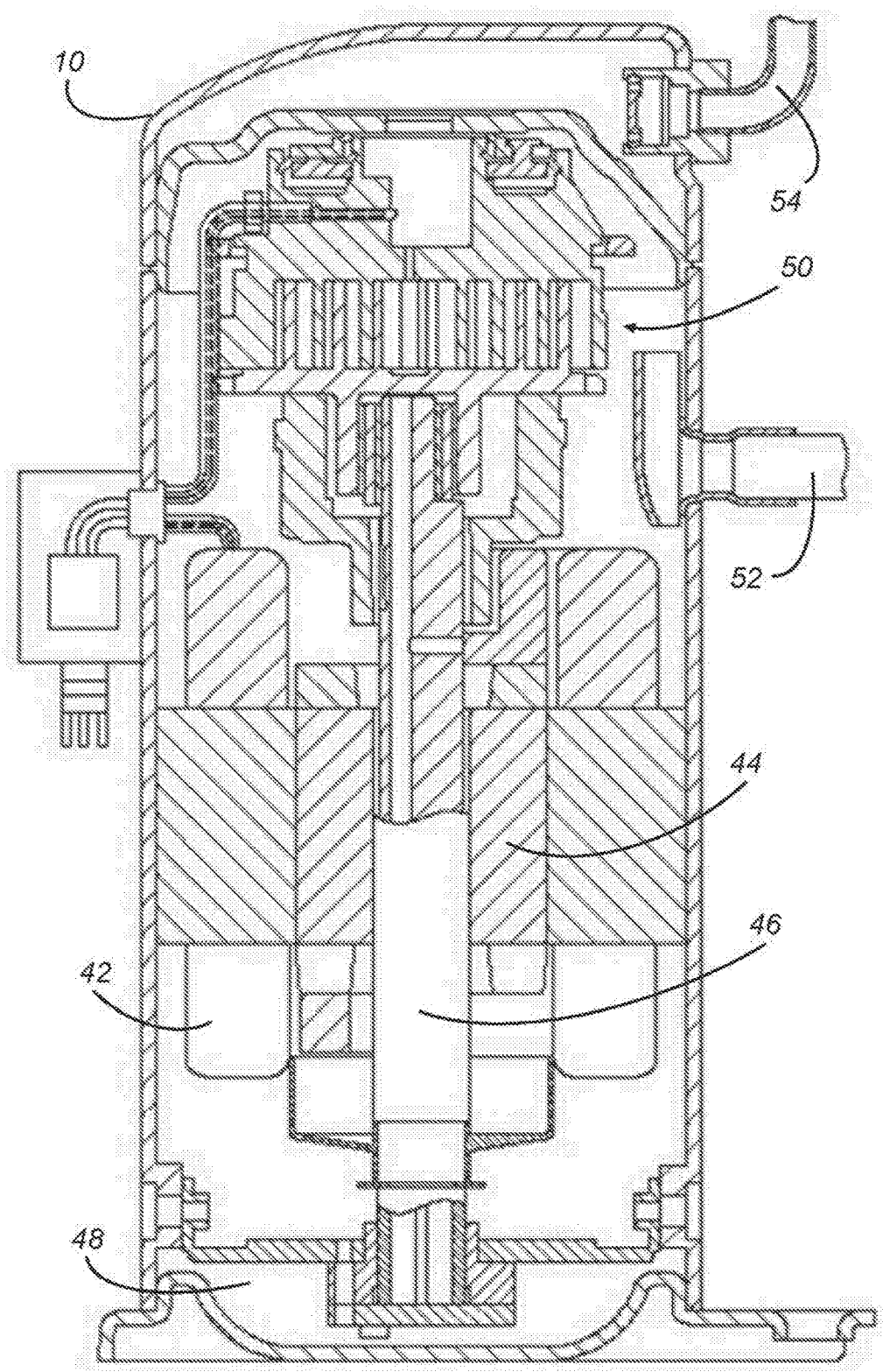
FIG. 2 is a cross sectional view of an example scroll compressor.

For example only, with reference to FIG. 2, the compressor 10 may be a scroll compressor where the compression mechanism includes a scroll having a pair of intermeshing scroll members. FIG. 2 includes a cross-sectional view of the example compressor 10.

The compressor 10 includes a stator 42 that magnetically turns a rotor 44 to drive a crankshaft 46 in the ON state. In various implementations, the crankshaft 46 can be driven in an open drive manner (not shown) where the motor or prime mover is located outside of the compressor 10. Power flow to the stator 42 controls magnetization of the stator 42. Power can also be applied to the stator 42 to control magnetization such that the rotor 44 is not driven while power is applied to the stator 42.

A lubricant sump 48 includes lubricant (e.g. oil) that lubricates moving parts of the compressor 10, such as the crankshaft 46. The compressor 10 includes a fixed scroll and an orbiting scroll, which are generally indicated by 50. When the scrolls 50 are meshed, rotation of the crankshaft 46 drives one of the scrolls 50 to compress refrigerant received via a suction tube 52. The scrolls 50 output compressed refrigerant via a discharge tube 54. The scrolls 50 can be unmeshed under some circumstances such that the scrolls 50 do not compress refrigerant.

Figure 3:
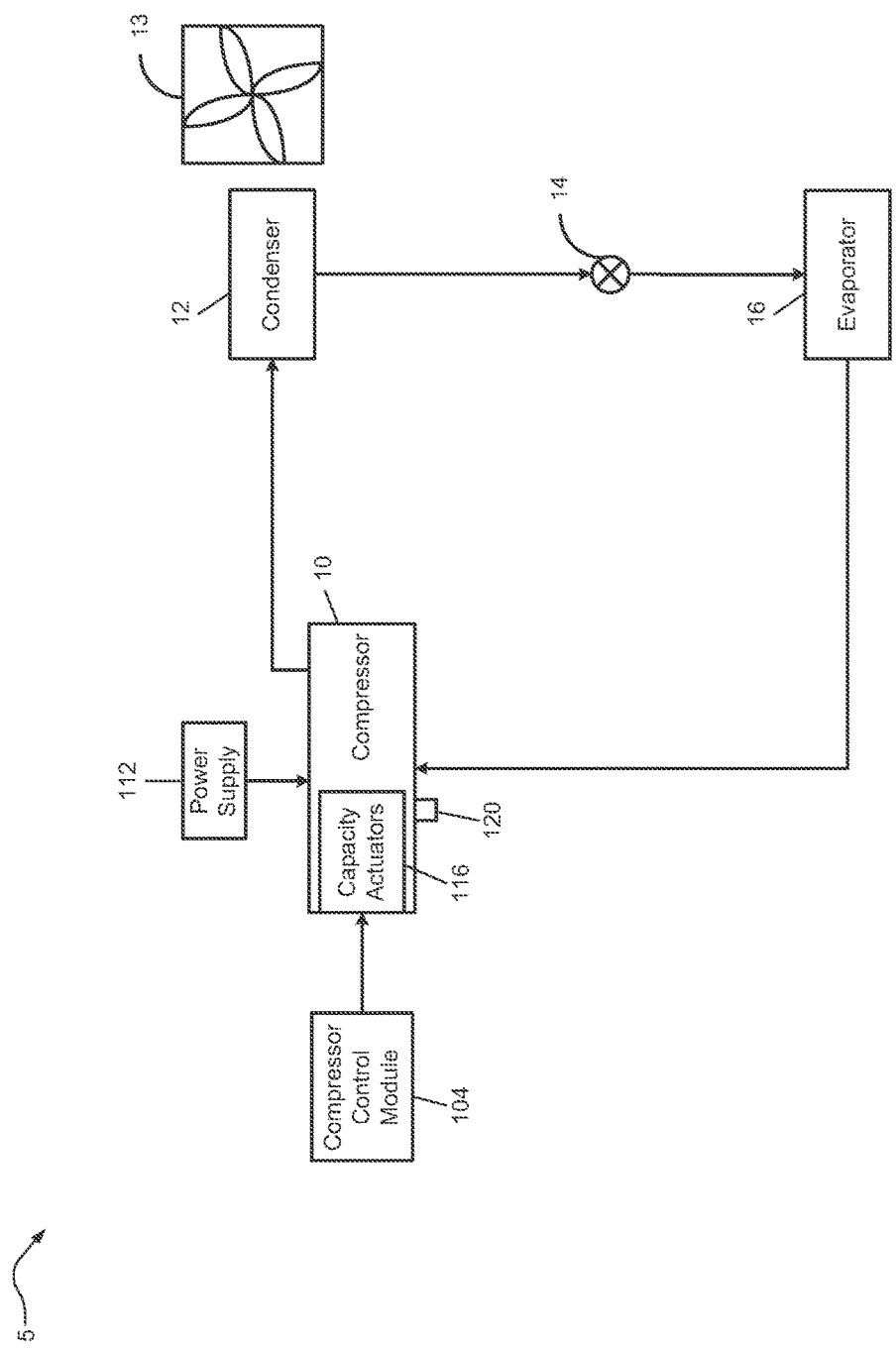
FIG. 3 is a functional block diagram of an example heat pump system.

While a scroll compressor is shown and discussed, the present application is also applicable to other types of variable capacity compressors having other types of compression mechanisms, such as reciprocating compressors and rotary compressors. Also, while a specific type of heat pump system is shown in FIGS. 1 and 3, the present teachings are also applicable to other types of heat pump systems, including other types of refrigeration systems, HVAC systems, chiller systems, and other suitable types of heat pump systems.

Referring back to FIG. 1, a compressor control module 104 controls a capacity of the compressor 10. The capacity of the compressor 10 may correspond to an amount of refrigerant flow through the compressor 10. In the example of FIG. 1, the compressor control module 104 varies a speed of the compressor 10 to vary the capacity of the compressor 10. As discussed further below, however, the capacity of the compressor 10 may be controlled in other ways.

A motor driver module 108 receives power from a power supply 112 (e.g., a utility) and provides power to the electric motor of the compressor 10 based on signals from the compressor control module 104. For example, the motor driver module 108 may receive alternating current (AC) voltage from the power supply 112 and deliver AC voltage to the electric motor of the compressor 10.

The motor driver module 108 includes electronic circuitry to modulate the frequency and/or amplitude of the output voltage. For example only, the motor driver module 108 may include a rectifier that converts an input AC voltage into a DC voltage. The motor driver module 108 further includes switching devices and one or more other components that convert the DC voltage into an output AC voltage that is supplied to the electric motor of the compressor 10.

The compressor control module 104 may control the switching devices to control frequency, amplitude, current and/or voltage output to the electric motor of the compressor 10. The compressor control module 104 may also regulate operation of the condenser fan 13.

Additionally or alternatively to controlling the capacity of the compressor 10 via the speed of the compressor 10, the compressor control module 104 may control one or more components of the compressor 10 to control the capacity of the compressor 10. Referring now to FIG. 3, a functional block diagram of the heat pump system 5 where the capacity of the compressor 10 is controlled via one or more capacity actuators 116 of the compressor 10 is presented.

The capacity actuator(s) 116 actuate based on signals from the compressor control module 104 to control the capacity of the compressor 10. For example, actuation of the capacity actuator(s) 116 may vary a volume of a compression chamber of the compressor 10. An example variable capacity compressor is described in commonly assigned U.S. patent application Ser. No. 12/789,105, titled "Compressor Having Capacity Modulation or Fluid Injection Systems," filed on May 27, 2010, now U.S. Pat. No. 8,616,014, issued on Dec. 31, 2013, the entire disclosures of which are incorporated herein by reference.

Referring now to FIGS. 1 and 3, the heat pump system 5 includes a compressor temperature sensor 120 that measures a temperature of the compressor 10 (Compressor temperature). For example only, the compressor temperature sensor 120 may measure temperature at the discharge line of the compressor 10, which may be referred to as discharge line temperature (DLT). Other examples of the temperature measured by the compressor temperature sensor 120 include, but are not limited to, a temperature of the motor of the compressor 10, an oil temperature of the compressor 10, and a discharge chamber temperature of the compressor 10.

Based on a compressor temperature measured using the compressor temperature sensor 120, the compressor control module 104 selectively adjusts the capacity of the compressor 10. For example, the compressor control module 104 may adjust the speed of the compressor 10 (e.g., as in the example of FIG. 1), the capacity actuator(s) 116 (e.g., as in the example of FIG. 3), or adjust the capacity of the compressor 10 in another suitable manner.

Figure 4A:
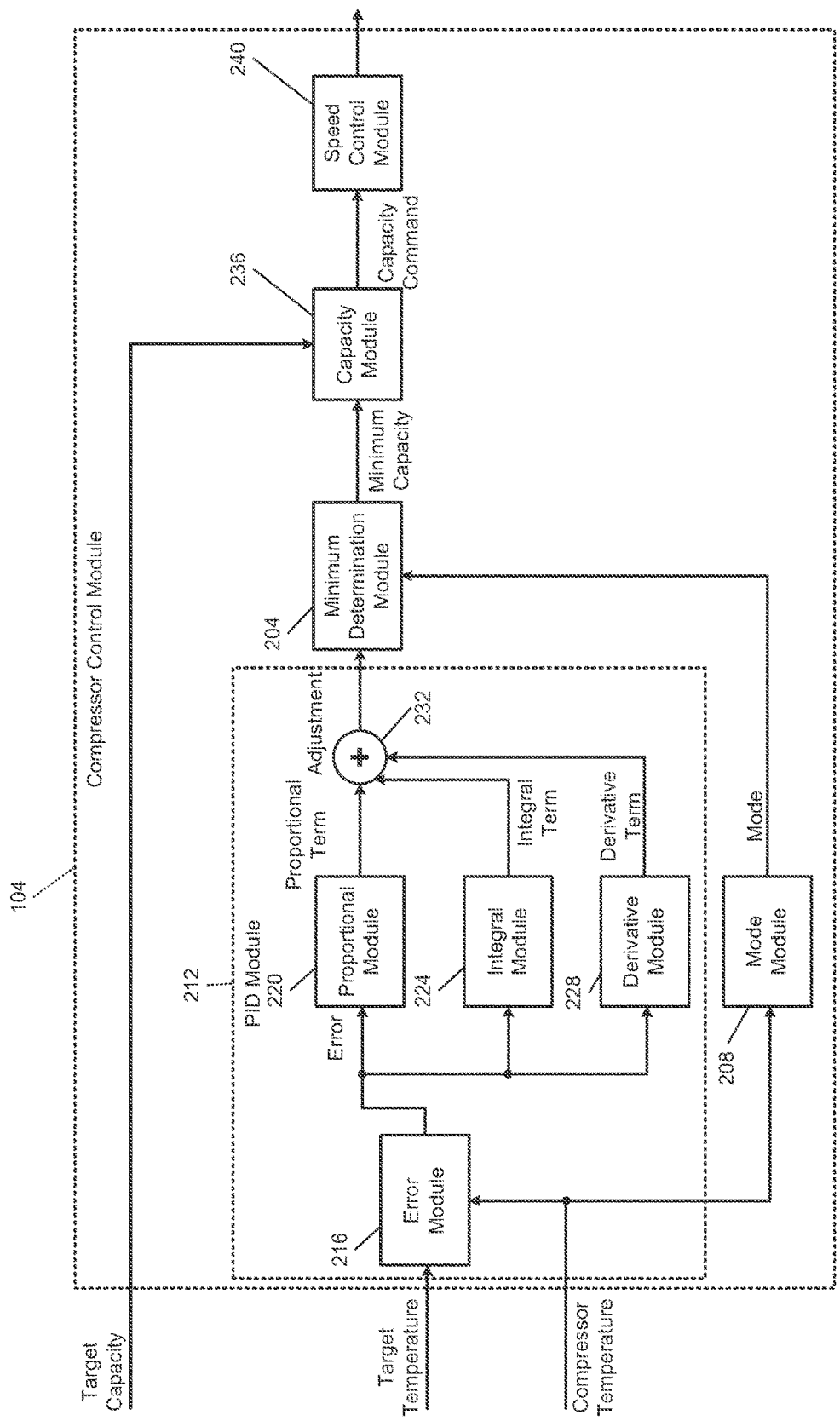
FIGS. 4A-4B are functional block diagrams of example compressor control modules.

Referring now to FIG. 4A, a functional block diagram of an example portion of the compressor control module 104 is presented. A minimum determination module 204 sets a minimum capacity of the compressor 10 based on a mode. A mode module 208 sets the mode based on a compressor temperature measured using the compressor temperature sensor 120.

For example, the mode module 208 may set the mode to a first mode when the compressor temperature is greater than a first predetermined temperature. The first predetermined temperature may be calibrated and may be set to, for example, approximately 260 degrees Fahrenheit (° F.), approximately 270° F., or another suitable temperature. The first predetermined temperature is less than a predetermined shutoff temperature of the compressor 10. For example only, the predetermined shutoff temperature may be approximately 280° F. or another suitable temperature. When the compressor temperature is greater than the predetermined shutoff temperature, the compressor control module 104 transitions the compressor 10 to the OFF state to protect the compressor 10.

When the compressor temperature is less than the first predetermined temperature and greater than a second predetermined temperature, the mode module 208 may set the mode to a second mode. The second predetermined temperature may be calibrated and may be set to, for example, approximately 220° F. or another suitable temperature that is less than the first predetermined temperature. The mode module 208 sets the mode to a third mode when the compressor temperature is less than the second predetermined temperature.

When the mode is set to the first mode (i.e., when the compressor temperature is greater than the first predetermined temperature), the minimum determination module 204 sets the minimum capacity of the compressor 10 to a predetermined maximum capacity. The minimum determination module 204 sets the minimum capacity of the compressor 10 to a predetermined minimum capacity when the mode is set to the second mode (i.e., when the compressor temperature is between the first and second predetermined temperatures). The predetermined maximum and minimum capacities may be calibrated and may be set, for example, to approximately 100 percent (%) and approximately 10%, respectively, or other suitable values.

When the mode is set to the third mode, the minimum determination module 204 selectively adjusts (increases or decreases) the minimum capacity of the compressor 10 based on an adjustment determined by a proportional, integral, derivative (PID) module 212. For example, the minimum determination module 204 may sum the adjustment with a previous value of the minimum capacity or adjust the minimum capacity in another suitable manner.

The PID module 212 includes an error module 216, a proportional module 220, an integral module 224, a derivative module 228, and an adder module 232. The error module 216 determines an error value based on the compressor temperature and a target compressor temperature. More specifically, the error module 216 determines the error value based on a difference between the compressor temperature and the target compressor temperature. The target compressor temperature may be set to a predetermined temperature, such as approximately 255° F. or another suitable temperature.

The proportional module 220 determines a proportional term based on the error value and a proportional gain. The integral module 224 determines an integral term based on an integral of the error value and an integral gain. The derivative module 228 determines a derivative term based on a derivative of the error value and a derivative gain. The adder module 232 determines an adjustment based on a sum of the proportional, integral, and derivative terms. As stated above, when the mode is set to the third mode, the minimum determination module 204 adjusts (increases or decreases) the minimum capacity based on the adjustment. Based on the adjustment, the minimum determination module 204 increases the minimum capacity when the compressor temperature is greater than the target compressor temperature.

A capacity module 236 generates a capacity command based on a target compressor capacity and the minimum capacity. More specifically, the capacity module 236 sets the capacity command to the greater one of the target compressor capacity and the minimum capacity. In this manner, when the target compressor capacity is greater than the minimum capacity, the capacity module 236 sets the capacity command to the target compressor capacity. When the target compressor capacity is less than the minimum capacity, the capacity module 236 sets the capacity command to the minimum capacity. The capacity module 236 also limits the capacity command to between the predetermined maximum and minimum capacities, inclusive. The target compressor capacity may be, for example, a predetermined value set by a user or may be provided by a system controller.

In the example of FIG. 4A, a speed control module 240 determines a target speed for the compressor 10 based on the capacity command. The speed control module 240 controls the motor driver module 108 based on the target speed.

In this manner, when the minimum capacity determined by the minimum determination module 204 increases (based on the compressor temperature), the speed control module 240 increases the speed of the compressor 10. This increases the flow rate of refrigerant through the compressor 10, thereby increasing the capacity of the compressor 10 to cool the compressor 10.

Figure 4B:
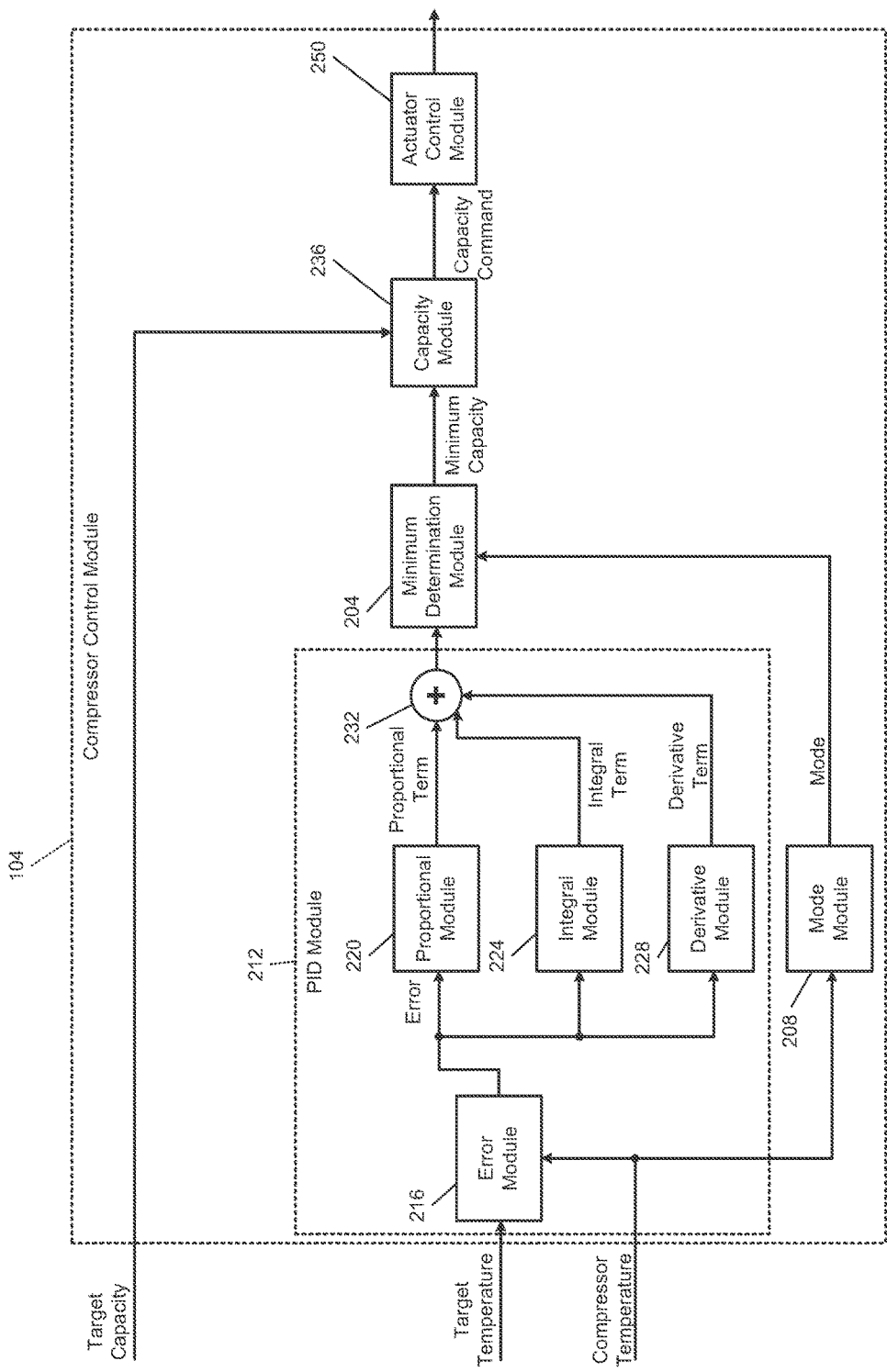

FIG. 4B is a functional block diagram of an example implementation of the compressor control module 104. The compressor control module 104 may include an actuator control module 250 in the place of the speed control module 240 of FIG. 4A. The actuator control module 250 determines one or more targets for the capacity actuator(s) 116 based on the capacity command. The actuator control module 250 controls actuation of the capacity actuator(s) 116 based on the target(s).

In this manner, when the minimum capacity determined by the minimum determination module 204 increases (based on the compressor temperature), the actuator control module 250 actuates the capacity actuator(s) 116 to increase the capacity of the compressor 10. Increasing the capacity of the compressor 10 increases refrigerant flow through the compressor 10 and cools the compressor 10.

Figure 5:
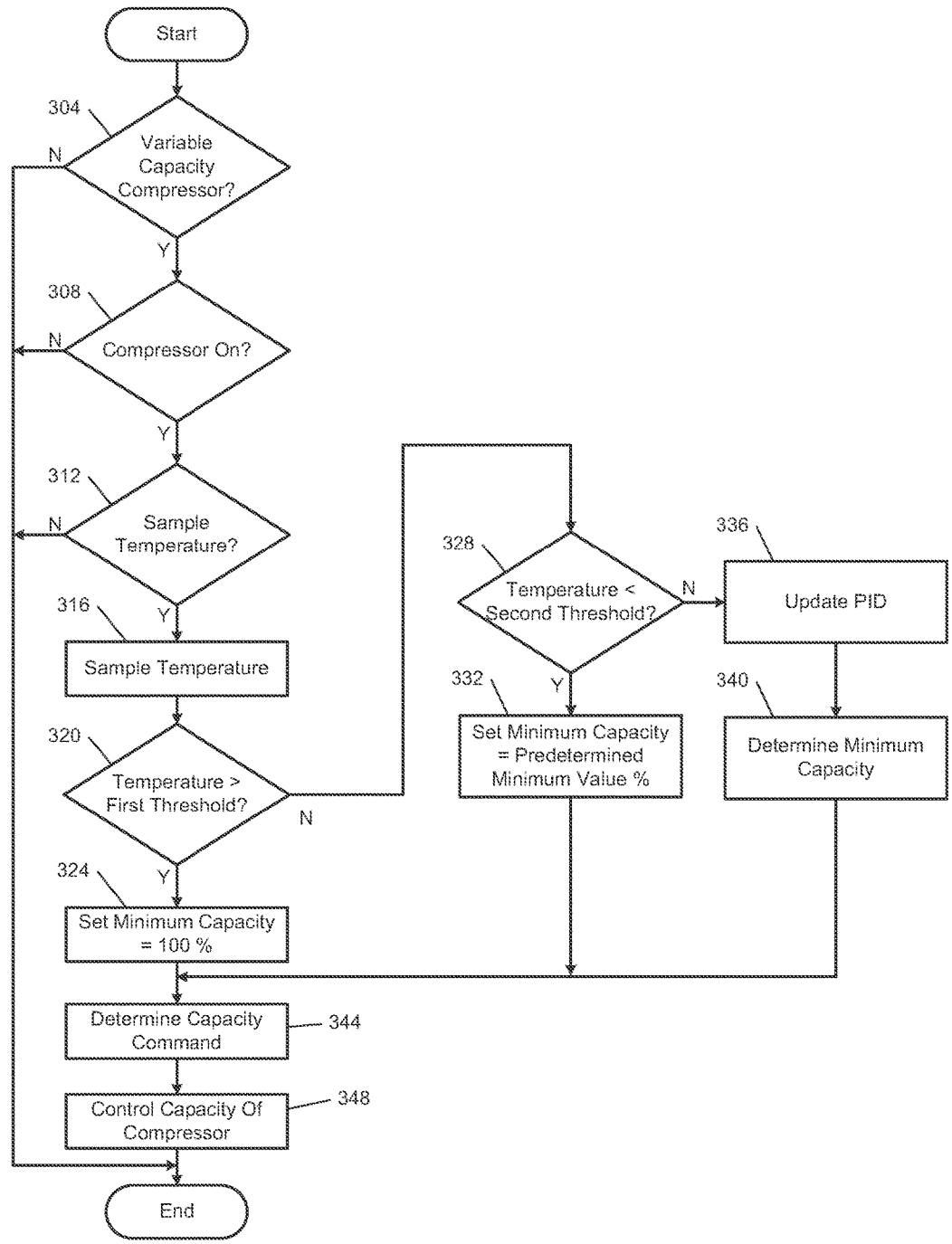
FIG. 5 is a flowchart depicting an example method of controlling the capacity of a compressor.

FIG. 5 is a flowchart depicting an example method of controlling the capacity of the compressor 10 based on the compressor temperature. Control may begin with 304 where the compressor control module 104 determines whether the capacity of the compressor 10 is variable, such as via the speed of the compressor 10 or via the capacity actuator(s) 116. If 304 is false, control may end. If 304 is true, control may continue with 308. The compressor control module 104 may determine whether the capacity of the compressor 10 is variable, for example, based on the state of a flag stored in memory.

At 308, the compressor control module 104 determines whether the compressor 10 is in the ON state. If 308 is true, control continues with 312. If 308 is false, the compressor 10 is in the OFF state, and control may end. At 312, the compressor control module 104 determines whether to sample the compressor temperature. If 312 is true, the compressor control module 104 samples the compressor temperature at 316, and control continues with 320. If 312 is false, control may end. The compressor control module 104 may sample the compressor temperature every predetermined period, such as 4 seconds, 10 seconds, or at another suitable sampling rate. The sampling rate may be slower than the rate at which a loop rate at which the example of FIG. 5 is performed.

At 320, the minimum determination module 204 determines whether the compressor temperature is greater than the first predetermined temperature. If 320 is true, the minimum determination module 204 sets the minimum capacity to the predetermined maximum capacity at 324, and control continues with 344, which is discussed further below. If 320 is false, control continues with 328.

The minimum determination module 204 determines whether the compressor temperature is less than the second predetermined temperature at 328. If 328 is true, the minimum determination module 204 sets the minimum capacity to the predetermined minimum capacity at 332, and control continues with 344. If 328 is false, control continues with 336. Control therefore continues with 336 when the compressor temperature is less than the first predetermined temperature and greater than the second predetermined temperature.

At 336, the PID module 212 updates the adjustment based on the difference between the sampled compressor temperature and the target compressor temperature. The minimum determination module 204 adjustments the minimum capacity based on the adjustment at 340, and control continues with 344.

The capacity module 236 determines the capacity command at 344. More specifically, the capacity module 236 sets the capacity command 344 to the greater one of the target compressor capacity and the minimum capacity. This enables the capacity of the compressor 10 to be controlled based on the target compressor capacity when the compressor temperature is low and to be increased, based on the minimum capacity, when the compressor temperature is higher and/or increasing. Increasing the compressor capacity cools the compressor 10 and decreases the compressor temperature.

At 348, the compressor control module 104 controls the capacity of the compressor 10 based on the capacity command. For example, the speed control module 240 may control the speed of the compressor 10 based on the capacity command, as in the example of FIG. 4A. Additionally or alternatively, the actuator control module 250 may control actuation of the capacity actuator(s) 116, as in the example of FIG. 4A. While controlling the capacity of the speed and/or the capacity actuator(s) 116 have been shown and discussed, the present application is also applicable to controlling compressor capacity in other ways.

Figure 6:
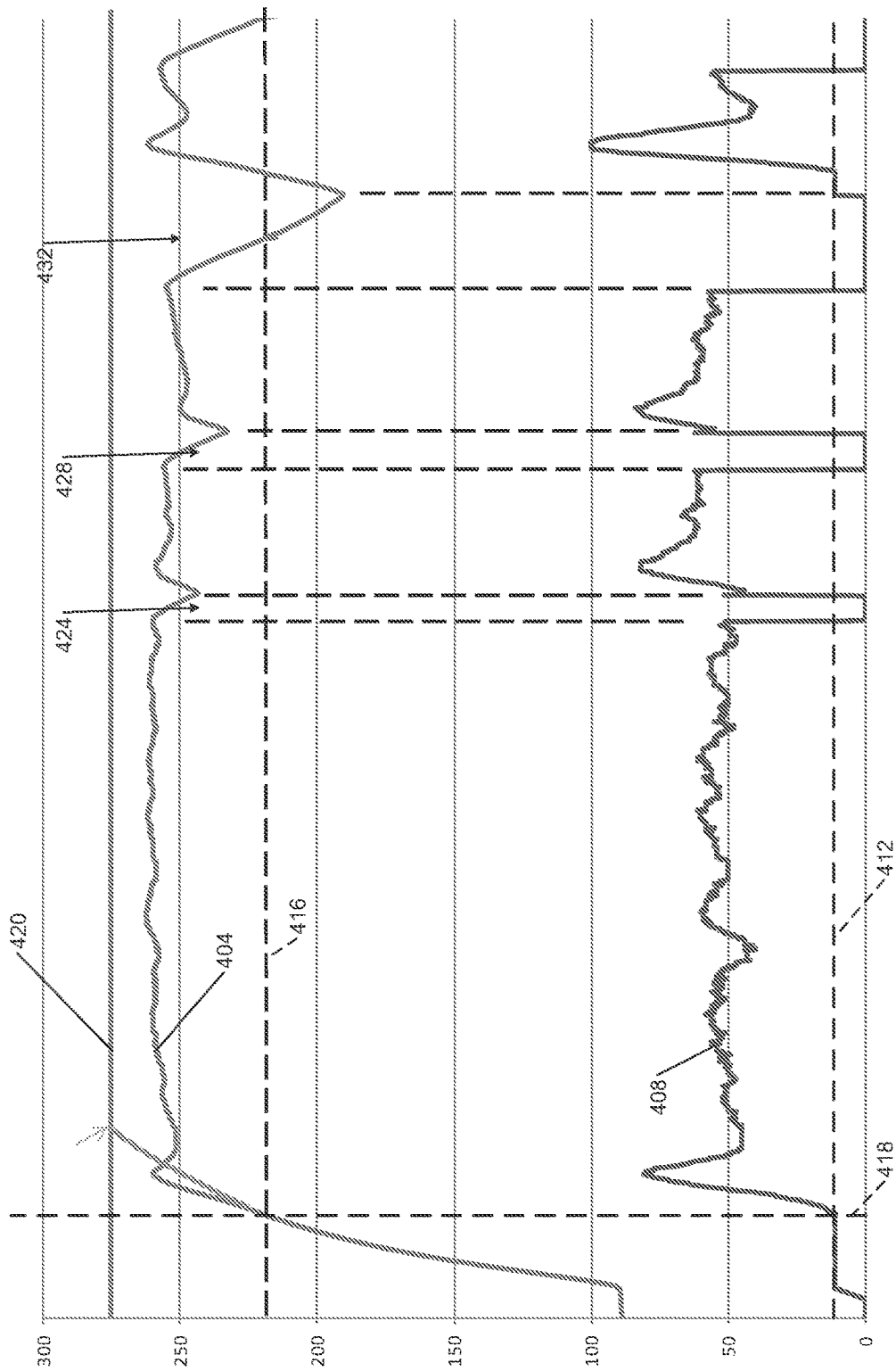
FIG. 6 is a graph including examples of compressor temperature and minimum compressor capacity.

FIG. 6 includes a graph including an example compressor temperature 404. FIG. 6 also includes an example minimum capacity 408 determined by the minimum determination module 204. Line 412 corresponds to an example value of the predetermined minimum capacity, line 416 corresponds to an example value of the second predetermined temperature, and line 420 corresponds to an example shutdown temperature where the compressor 10 will be transitioned to the OFF state. As noted above, the first predetermined temperature is greater than the second predetermined temperature and is less than the predetermined temperature where the compressor 10 is transitioned to the OFF state.

For the example of FIG. 6, the target compressor capacity is equal to or less than the predetermined minimum capacity 412. As such, the capacity of the compressor 10 will be controlled based on the minimum capacity 408 when the minimum capacity 408 is greater than the predetermined minimum capacity 412.

Initially, the compressor temperature 404 is less than the second predetermined temperature 416. Therefore, the minimum determination module 204 sets the minimum capacity 408 to the predetermined minimum capacity 412. At approximately time 418, the compressor temperature 404 becomes greater than the second predetermined temperature

416. The minimum determination module 204 therefore begins adjusting the minimum capacity 408 based on the adjustment. As discussed above, the PID module 212 determines the adjustment based on the difference between the compressor temperature and the target temperature.

The capacity of the compressor 10 is therefore increased and modulated based on the minimum capacity 408. Increasing the capacity of the compressor 10 cools the compressor 10. As illustrated by FIG. 6, adjusting the minimum capacity 408 based on the adjustment prevents the compressor temperature from reaching the predetermined shutoff temperature 420 and, therefore, prevents the compressor 10 from being transitioned to the OFF state.

In FIG. 6, the compressor 10 transitioned to the OFF state during periods 424, 428, and 432. The compressor temperature 404 decreases when the compressor 10 is in the OFF state. When the compressor temperature 404 decreases to less than the second predetermined temperature 416 while the compressor 10 is in the OFF state, the minimum determination module 204 may set the minimum capacity to the predetermined minimum capacity when the compressor 10 next transitions to the ON state. When the compressor temperature 404 is greater than the second predetermined temperature 416 when the compressor 10 transitions to the ON state after being in the OFF state, the minimum determination module 204 may set the minimum capacity to the minimum capacity used when the compressor 10 was transitioned to the OFF state.

Figure 7A:
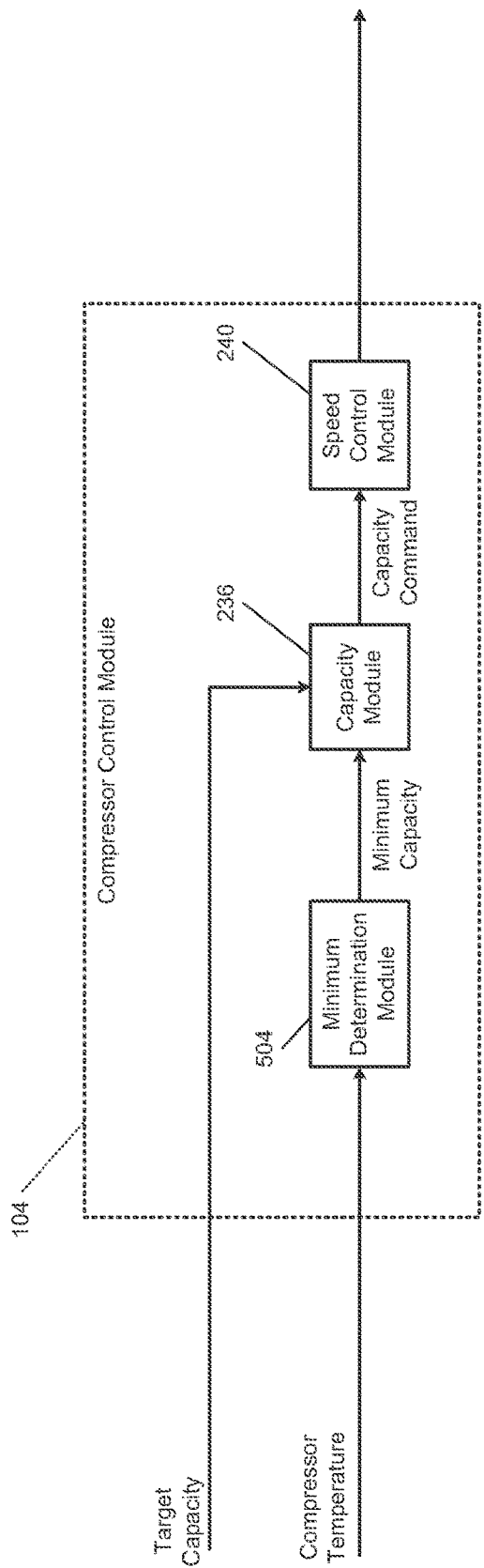
FIGS. 7A-7B are functional block diagrams of example compressor control modules.
Figure 7B:
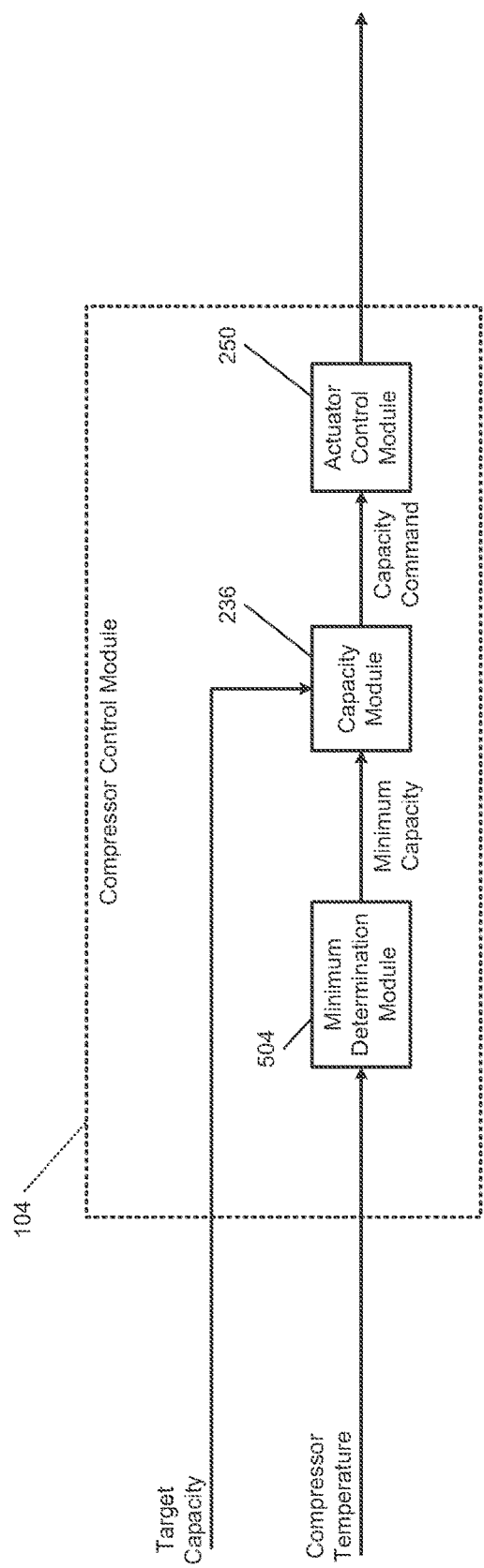

Referring now to FIG. 7A, a functional block diagram of an example implementation of the compressor control module 104 is presented. The compressor control module 104 includes a minimum determination module 504. The minimum determination module 504 determines the minimum capacity for the compressor 10 using one of a function and a mapping that relates the compressor temperature to the minimum capacity. The capacity module 236 generates the capacity command based on the greater one of the target capacity and the minimum capacity, as discussed above. In the example of FIG. 7A, the speed control module 240 controls the speed of the compressor 10 based on the capacity command, as described above. In the example of FIG. 7B, the actuator control module 250 controls the capacity actuator(s) 116 based on the capacity command, as described above.

Figure 8:
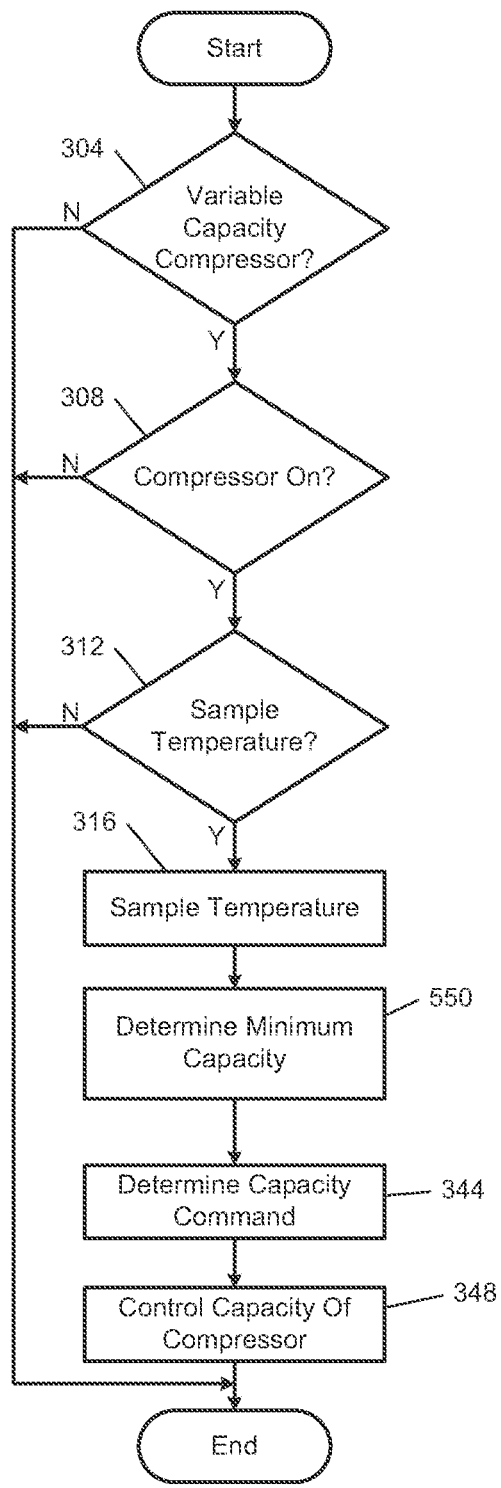
FIG. 8 is a flowchart depicting an example method of controlling the capacity of a compressor.

FIG. 8 is a flowchart depicting an example method of controlling the capacity of the compressor 10, for example, according to the examples of FIGS. 7A and 7B. Control proceeds with 304-316, as discussed above. Control continues with 550 after 316. At 550, the minimum determination module 504 determines the minimum capacity using the function or mapping that relates the compressor temperature to the minimum capacity. Control then continues with 344-348, as discussed above.

Referring now to FIG. 9A, a functional block diagram of an example implementation of the compressor control module 104 is presented. The compressor control module 104 includes a minimum determination module 604 that increments and decrements the minimum capacity based on the compressor temperature.

The minimum determination module 604 increments the minimum capacity by a predetermined increment amount when the compressor temperature is greater than a third predetermined temperature for a first predetermined period. The predetermined increment amount may be calibrated and may be, for example, approximately 10% or another suitable amount. The first predetermined period may be calibrated and may be, for example, approximately 1 minute or another suitable period. The third predetermined temperature is less than the predetermined temperature where the compressor 10 is transitioned to the OFF state to protect the compressor 10, may be calibrated, and may be, for example, approximately 250° F. or another suitable temperature.

The minimum determination module 604 decrements the minimum capacity by a predetermined decrement amount when the compressor temperature is less than a fourth predetermined temperature for a second predetermined period. The predetermined decrement amount may be calibrated, may be the same as or different than the predetermined increment amount, and may be, for example, approximately 10% or another suitable amount. The second predetermined period may be calibrated, may be the same as or different than the first predetermined period, and may be, for example, approximately 1 minute or another suitable period. The fourth predetermined temperature is less than the third predetermined temperature, may be calibrated, and may be, for example, approximately 240° F. or another suitable temperature. The minimum determination module 604 also limits the minimum capacity between the predetermined minimum and maximum capacities, inclusive.

Figure 9B:
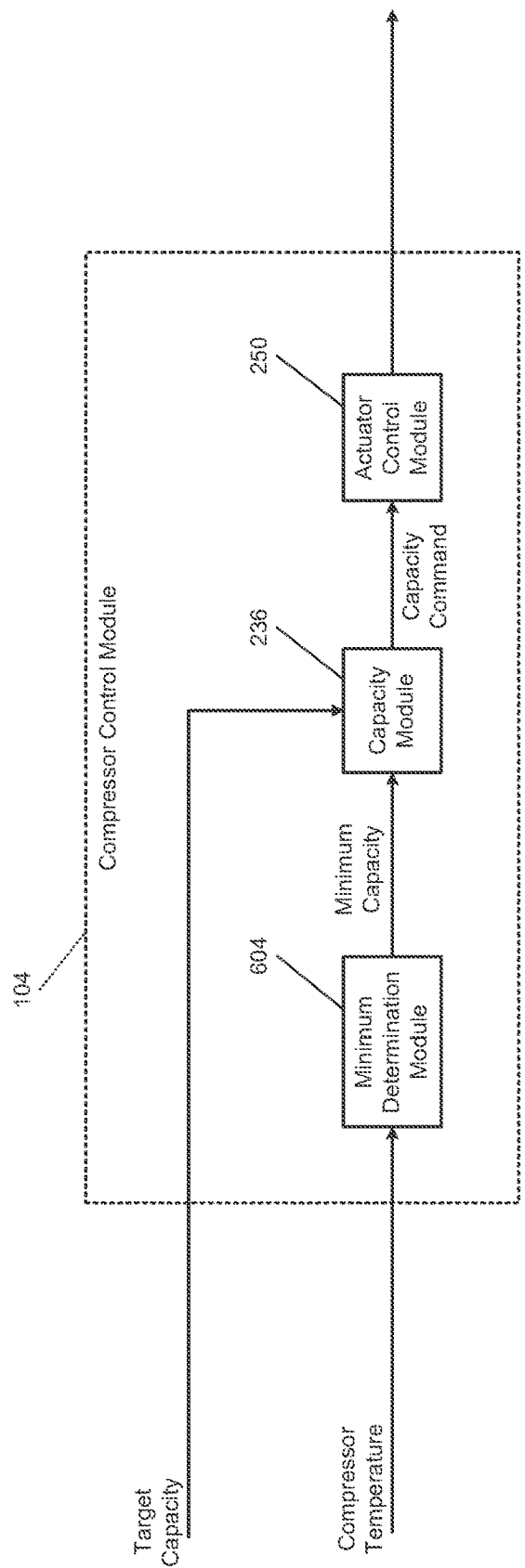

The capacity module 236 generates the capacity command based on the greater one of the target capacity and the minimum capacity, as discussed above. In the example of FIG. 9A, the speed control module 240 controls the speed of the compressor 10 based on the capacity command, as described above. In the example of FIG. 9B, the actuator control module 250 controls the capacity actuator(s) 116 based on the capacity command, as described above.

Figure 10:
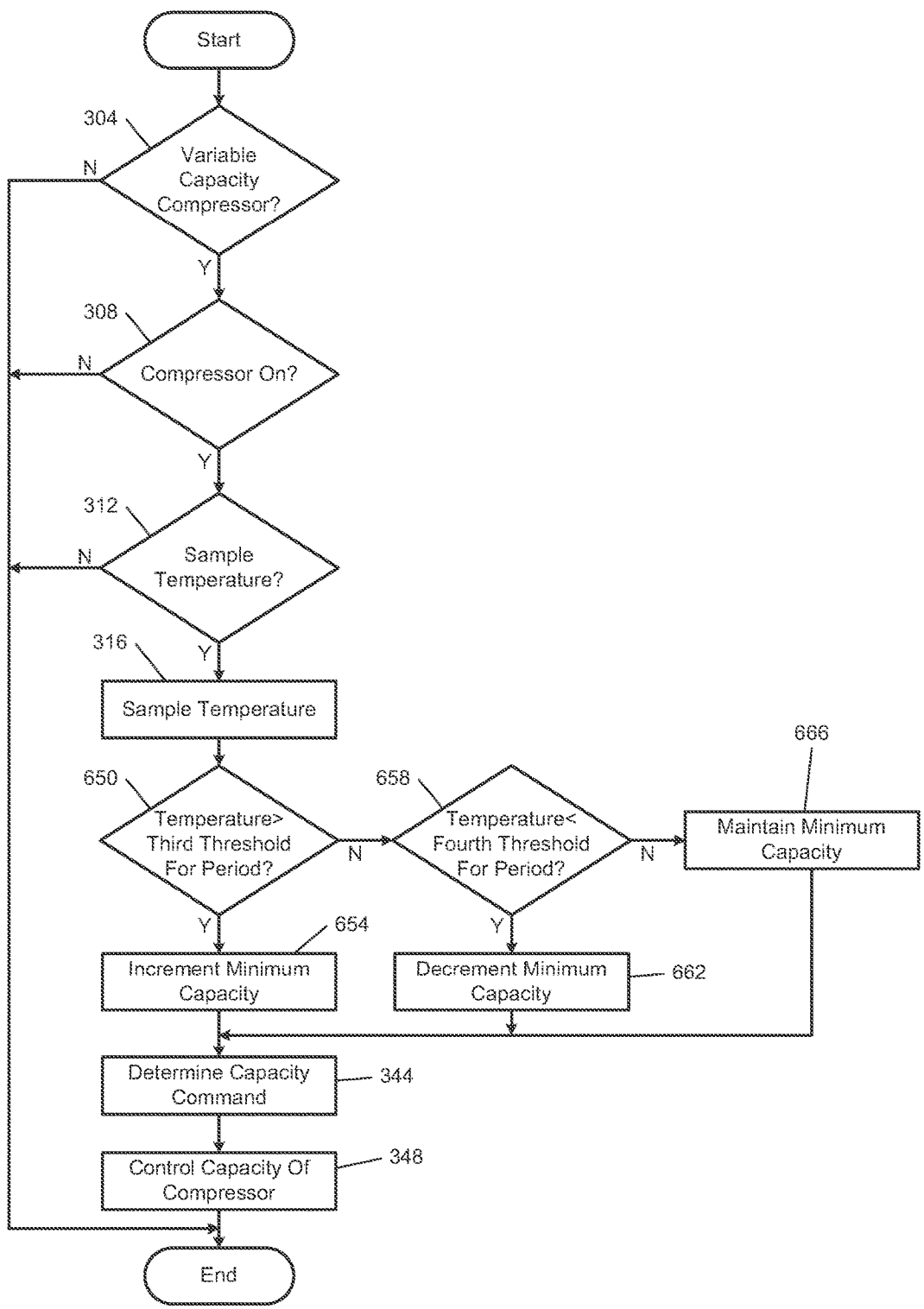
FIG. 10 is a flowchart depicting an example method of controlling the capacity of a compressor.

FIG. 10 is a flowchart depicting an example method of controlling the capacity of the compressor 10, for example, according to the examples of FIGS. 9A and 9B. Control proceeds with 304-316, as discussed above. Control continues with 650 after 316.

At 650, the minimum determination module 504 determines whether the compressor temperature is greater than the third predetermined temperature. If 650 is true, the minimum determination module 504 increments the minimum capacity by the predetermined increment amount at 654, and control continues with 344-348, as discussed above. If 650 is false, control continues with 658.

The minimum determination module 504 determines whether the compressor temperature is less than the fourth predetermined temperature at 658. If 658 is true, the minimum determination module 504 decrements the minimum capacity by the predetermined decrement amount at 662, and control continues with 344-348, as discussed above. If 658 is false, the minimum determination module 504 maintains the minimum capacity at 666, and control continues with 344-348, as discussed above.

When a fault is diagnosed in the compressor temperature sensor 120, the minimum determination module 504 may set the minimum capacity to a predetermined capacity. For example, the predetermined capacity may be approximately 50% or another suitable capacity. This may enable continued operation of the compressor 10 after a fault is diagnosed in the compressor temperature 120. One or more indicators may be generated when a fault is diagnosed in the compressor temperature sensor 120 to indicate the presence of a fault and/or to seek service.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A compressor capacity control system comprising:
   a minimum determination module that selectively increases a minimum capacity of a compressor when a temperature of the compressor is greater than a first predetermined temperature and that sets the minimum capacity to a predetermined maximum capacity of the compressor when the temperature of the compressor is greater than a second predetermined temperature,
   wherein the second predetermined temperature is greater than the first predetermined temperature;
   a capacity command module that compares the minimum capacity with a target capacity of the compressor and that, based on the comparison, sets a capacity command to a greater one of the minimum capacity and the target capacity of the compressor,
   wherein the target capacity is a predetermined value that is one of (a) set by a user and (b) provided by a controller; and
   a control module that controls an actual capacity of the compressor based on the capacity command, the control including increasing an actual capacity of the compressor in response to an increase in the minimum capacity and adjusting the actual capacity of the compressor to the predetermined maximum capacity in response to the minimum capacity being set to the predetermined maximum capacity.

2. The compressor capacity control system of claim 1 wherein the minimum determination module sets the minimum capacity to a predetermined minimum capacity of the compressor when the temperature of the compressor is less than the first predetermined temperature.

3. The compressor capacity control system of claim 1 further comprising a proportional, integral, derivative (PID) module that determines an adjustment value based on a difference between the temperature of the compressor and a target compressor temperature,
   wherein the minimum determination module adjusts the minimum capacity based on the adjustment value.

4. The compressor capacity control system of claim 3 wherein the PID module increases the adjustment value when the temperature of the compressor is greater than the target compressor temperature, and
   wherein the minimum determination module increases the minimum capacity when the adjustment value increases.

5. The compressor capacity control system of claim 3 wherein the PID module decreases the adjustment value when the temperature of the compressor is less than the target compressor temperature, and
   wherein the minimum determination module decreases the minimum capacity when the adjustment value decreases.

6. The compressor capacity control system of claim 1 wherein the minimum determination module determines the minimum capacity using one of a function and a mapping that relates the temperature of the compressor to the minimum capacity.

7. The compressor capacity control system of claim 1 wherein the minimum determination module:
   increments the minimum capacity by a predetermined increment amount when the temperature of the compressor is greater than a third predetermined temperature for a first predetermined period; and
   decrements the minimum capacity by a predetermined decrement amount when the temperature of the compressor is less than a fourth predetermined temperature for a second predetermined period.

8. The compressor capacity control system of claim 7 wherein the fourth predetermined temperature is less than the third predetermined temperature.

9. The compressor capacity control system of claim 1 wherein the temperature of the compressor is measured using a discharge temperature sensor.

10. The compressor capacity control system of claim 1 wherein the control module increases a speed of the compressor in response to the increase in the minimum capacity.

11. The compressor capacity control system of claim 1 wherein the control module increases a volume of a compression chamber of the compressor in response to the increase in the minimum capacity.

12. A compressor capacity control method comprising:
    selectively increasing a minimum capacity of a compressor when a temperature of the compressor is greater than a first predetermined temperature;

setting the minimum capacity to a predetermined maximum capacity of the compressor when the temperature of the compressor is greater than a second predetermined temperature, wherein the second predetermined temperature is greater than the first predetermined temperature;

comparing the minimum capacity with a target capacity of the compressor, wherein the target capacity is a predetermined value that is one of (a) set by a user and (b) provided by a controller;

based on the comparison, setting a capacity command to a greater one of the minimum capacity and the target capacity of the compressor;

controlling an actual capacity of the compressor based on the capacity command, the controlling including:
 increasing an actual capacity of the compressor in response to an increase in the minimum capacity; and
 adjusting the actual capacity of the compressor to the predetermined maximum capacity in response to the minimum capacity being set to the predetermined maximum capacity.

13. The compressor capacity control method of claim 12 further comprising setting the minimum capacity to a predetermined minimum capacity of the compressor when the temperature of the compressor is less than the first predetermined temperature.

14. The compressor capacity control method of claim 12 further comprising:
 determining an adjustment value, using a proportional, integral, derivative (PID) module, based on a difference between the temperature of the compressor and a target compressor temperature; and
 adjusting the minimum capacity based on the adjustment value.

15. The compressor capacity control method of claim 14 further comprising:
 increasing the adjustment value when the temperature of the compressor is greater than the target compressor temperature;
 decreasing the adjustment value when the temperature of the compressor is less than the target compressor temperature;
 increasing the minimum capacity when the adjustment value increases; and
 decreasing the minimum capacity when the adjustment value decreases.

16. The compressor capacity control method of claim 12 further comprising determining the minimum capacity using one of a function and a mapping that relates the temperature of the compressor to the minimum capacity.

17. The compressor capacity control method of claim 12 further comprising:
 incrementing the minimum capacity by a predetermined increment amount when the temperature of the compressor is greater than a third predetermined temperature for a first predetermined period; and
 decrementing the minimum capacity by a predetermined decrement amount when the temperature of the compressor is less than a fourth predetermined temperature for a second predetermined period.

18. The compressor capacity control method of claim 17 wherein the fourth predetermined temperature is less than the third predetermined temperature.

19. The compressor capacity control method of claim 12 wherein increasing the actual capacity of the compressor includes increasing a speed of the compressor in response to the increase in the minimum capacity.

20. The compressor capacity control method of claim 12 wherein increasing the actual capacity of the compressor includes increasing a volume of a compression chamber of the compressor in response to the increase in the minimum capacity.

\* \* \* \* \*